US011445370B2

(12) United States Patent
Li et al.

(10) Patent No.: US 11,445,370 B2
(45) Date of Patent: Sep. 13, 2022

(54) METHOD AND DEVICE FOR VERIFYING KEY REQUESTER

(71) Applicant: HUAWEI TECHNOLOGIES CO., LTD., Guangdong (CN)

(72) Inventors: He Li, Shanghai (CN); Jing Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 465 days.

(21) Appl. No.: 16/453,833

(22) Filed: Jun. 26, 2019

(65) Prior Publication Data
US 2019/0320320 A1 Oct. 17, 2019

Related U.S. Application Data

(63) Continuation of application No. PCT/CN2016/113941, filed on Dec. 30, 2016.

(51) Int. Cl.
*H04W 12/069* (2021.01)
*H04L 9/08* (2006.01)
(Continued)

(52) U.S. Cl.
CPC ......... *H04W 12/069* (2021.01); *H04L 9/0825* (2013.01); *H04L 9/3247* (2013.01); *H04W 12/062* (2021.01)

(58) Field of Classification Search
CPC . H04W 12/06; H04W 12/0431; H04W 12/08; H04W 12/72; H04L 9/0825; H04L 9/3247; H04L 63/10; H04L 63/08
See application file for complete search history.

(56) References Cited

U.S. PATENT DOCUMENTS 7,107,620 B2 * 9/2006 Haverinen .............. H04L 63/08
713/168
9,807,819 B1 * 10/2017 Zhu .................... H04W 36/0011
(Continued)

FOREIGN PATENT DOCUMENTS

CN 101272616 A 9/2008
CN 101951603 A 1/2011
(Continued)

OTHER PUBLICATIONS

3GPP TR 23.799 V1.2.1, Anonymous: "3rd Generation Partnership Project; Technical Specification Group Services and System Aspects; Study on Architecture for Next Generation System (Release 14)", 3GPP Standard; Nov. 2016. total 34 pages, XP055639072.
(Continued)

*Primary Examiner* — Lizbeth Torres-Diaz
(74) *Attorney, Agent, or Firm* — Womble Bond Dickinson (US) LLP

(57) ABSTRACT

A method and device for verifying a key requester are described. The method may include a security function entity receiving a request message sent by a user management function (UMF) entity. The method may also include decrypting information in the request message by using a private key of the security function entity, and obtaining the information carried in the request message after signature verification on decrypted information using a public key in a certificate of the UMF entity succeeds. Furthermore, the method may include determining to provide a key of a user equipment (UE) for the UMF entity, when determining that a first verification parameter carried in the request message is valid and determining that an identifier which is of the UMF entity and which is carried in the request message is the same as an identifier of a UMF entity to which the UE attaches.

10 Claims, 14 Drawing Sheets

(51) Int. Cl.
H04L 9/32 (2006.01)
H04W 12/062 (2021.01)

(56) References Cited

U.S. PATENT DOCUMENTS

| | | | | |
|---|---|---|---|---|
| 2005/0003798 | A1* | 1/2005 | Jones | H04W 4/24 455/406 |
| 2007/0198837 | A1* | 8/2007 | Koodli | H04W 12/0471 713/153 |
| 2012/0238247 | A1* | 9/2012 | Wen | H04W 76/12 455/411 |
| 2013/0157661 | A1* | 6/2013 | Bhaskaran | H04W 60/00 455/436 |
| 2013/0290696 | A1* | 10/2013 | Broustis | H04L 9/14 713/150 |
| 2014/0344578 | A1* | 11/2014 | Kim | H04W 12/037 713/168 |
| 2015/0382253 | A1* | 12/2015 | Suh | H04W 12/062 455/411 |
| 2016/0366137 | A1* | 12/2016 | Borgards | H04W 12/08 |
| 2017/0127285 | A1* | 5/2017 | Nair | H04W 12/122 |
| 2017/0142587 | A1* | 5/2017 | Lee | H04W 76/15 |
| 2017/0295523 | A1* | 10/2017 | Cho | H04W 36/0033 |
| 2018/0026982 | A1* | 1/2018 | Wei | H04W 12/08 726/4 |
| 2019/0320320 | A1* | 10/2019 | Li | H04L 9/3247 |
| 2020/0015076 | A1* | 1/2020 | Vamanan | H04W 68/02 |

FOREIGN PATENT DOCUMENTS

| | | |
|---|---|---|
| CN | 103188229 A | 7/2013 |
| CN | 105577626 A | 5/2016 |
| CN | 105577627 A | 5/2016 |

OTHER PUBLICATIONS

Huawei, Hisilicon, CATR, Solution: Consolidated architecture option X. SA WG2 Meeting #117 Oct. 17-21, 2016, Kaohsiung city, Taiwan, S2-166170, 7 pages.

* cited by examiner

METHOD AND DEVICE FOR VERIFYING KEY REQUESTER

CROSS-REFERENCE TO RELATED APPLICATIONS

This application is a continuation of International Application No. PCT/CN2016/113941, filed on Dec. 30, 2016, the disclosure of which is hereby incorporated by reference in its entirety.

TECHNICAL FIELD

This application relates to the field of communications technologies, and in particular, to a method and device for verifying a key requester.

BACKGROUND

A Long Term Evolution (LTE) system architecture is shown in FIG. 1, where a mobility management entity (MME) is a network element that is on a core network side and that is responsible for security, mobility management, and session management. The security means that when initially accessing a network, a terminal, also as User Equipment (UE) and the network need to perform mutual authentication. After the mutual authentication is performed, the UE and a core network generate a key. After the key is generated, the UE and the MME perform algorithm negotiation, that is, security capability negotiation. The mobility management means that position information of the UE is recorded, and based on the position information of the UE, a suitable user plane network element device is selected for the UE. The session management is responsible for establishing of a user plane link of the UE. A home subscriber server (HSS) is configured to store subscription information of a user. An evolved Universal Mobile Telecommunications System (UMTS) terrestrial radio access network (E-UTRAN) is an air interface access part in LTE, and is usually referred to as an evolved NodeB (eNodeB).

In a 5G architecture shown in FIG. 2, an MME is split into three functions: authentication (AUF), a user management function (UMF), and session management SMF). In 5G, a concept of a slice is added. One slice may be understood as a set of functions specific to a service provided to a special user. For example, a slice A is dedicated for an Internet of Things device. Each slice has its own control plane network function (CP NF), which is mainly an SMF. A user plane network function (UP NF) in each slice is a packet data network gateway (P-GW), and is configured to forward data of UE to a suitable service. A common CP NF is a control plane function shared by several slices, and includes a UMF and an AUF. A slice selection function (SSF) is configured to help the UE select a slice.

An authentication credential repository and processing function entity (ARPF) is configured to store subscription data of a user in a unified data management entity (UDM). The AUF, serving as a security function, may be independently deployed, or may be deployed together with an entity having a UMF function. The AUF may be further divided into entities such as a security anchor function (SEAF), a security context management function (SCMF), and a security policy control function. The SEAF entity is configured to interact with the UE and an authentication server, and receive an intermediate key after an authentication procedure. The SCMF entity is configured to obtain the key from the SEAF entity and further derive another key. These function entities may not be specifically divided, but all corresponding functions are reflected in the AUF.

It can be learned that, a most important part of an evolution from 5G to 4G is splitting the MME. After the splitting, a part is used as a public function, and a part is placed into a particular slice to serve the particular slice.

In LTE, UE initiates a network attach procedure. The attach procedure includes a security procedure, and the security procedure includes three processes: mutual authentication, key generation, and security capability negotiation. The mutual authentication means that the UE and a core network authenticate each other. An effect that can be achieved after the authentication ends is as follows: The UE considers that the core network is real, and the core network considers that the UE is real. After the authentication or during the authentication, a key for protecting a NAS message is generated. After the key is generated, security capability negotiation between the UE and an MME starts. A security capability is an encryption algorithm and an integrity protection algorithm that are used subsequently.

An existing 5G security procedure is shown in FIG. 3, and details are specifically as follows:

Step 1. The UE initiates an attach request.

Step 2. The UE and an SEAF entity complete mutual authentication.

Step 3. A UMF entity requests the SEAF entity for a security context.

Step 4. The UE and the UMF entity initiate a NAS MM SMC procedure, which is an MM algorithm negotiation procedure.

Step 5. An SSF entity forwards the attach request to the UMF entity.

The UE and the UMF entity complete the rest of the attach procedure:

Step 6. The UMF entity forwards a session management request to an SMF entity.

Step 7. The SMF entity obtains a security policy.

Step 8. The SMF entity obtains a user plane security context of the UE from the SEAF entity, where content of the user plane security context has not been defined.

Step 9. The SMF entity initiates a user plane NAS UP SMC procedure.

Step 10. Other security procedures start.

Based on the 5G security procedure, it can be learned that, due to the splitting of the MME, the UMF entity is an entity of processing NAS signaling security, but the UMF entity has no security function. The SEAF entity generating the key and the UMF entity are independent from each other. Therefore, the UMF entity needs to request the SEAF entity for the key.

It can be learned that, in the 5G security procedure, after initially accessing the network and successfully performing authentication, the UE forwards an attach message to the UMF entity, and the UMF entity needs to request the SEAF entity for a security key that needs to be used subsequently. However, because there is only one SEAF entity but there are a plurality of UMF entities in the network, in the initial network access process, the SEAF entity needs to determine whether the UMF entity requesting the key is a UMF entity to which the UE attaches.

SUMMARY

Embodiments of this application provide a method and device for verifying a key requester, to verify, in an initial network access process, whether a key requester is an entity that can obtain a key.

Specific technical solutions provided in the embodiments of this application are as follows:

According to a first aspect, an embodiment of this application provides a method for verifying a key requester, including: receiving, by a security function entity, a request message sent by a user management function UMF entity; decrypting, by the security function entity, information in the request message by using a private key of the security function entity, and obtaining the information carried in the request message after signature verification on decrypted information by using a public key in a certificate of the UMF entity succeeds; and determining, by the security function entity, to provide a key of a UE for the UMF entity, if determining that a first verification parameter carried in the request message is valid and determining that an identifier which is of the UMF entity and which is carried in the request message is the same as an identifier of a UMF entity to which the UE attaches.

In the method, the security function entity decrypts, by using the private key of the security function entity, the request message sent by the UMF entity, and after the signature verification on the decrypted information by using the public key in the certificate of the UMF entity succeeds, determines, based on the verification of the first verification parameter carried in the request message, the identifier of the UMF entity, and the identifier of the UMF entity to which the terminal attaches, whether the UMF entity requesting the key is a UMF entity that can obtain the key.

In a possible embodiment, the method further includes: generating, by the security function entity, a fresh parameter (fresh); and notifying, by the security function entity, the UMF entity to which the UE attaches of the fresh parameter by using a core-network network element, so that the UMF entity to which the UE attaches adds the fresh parameter to the request message as the first verification parameter. In this embodiment, the security function entity notifies the UMF entity to which the UE attaches of the fresh parameter by using the core-network network element, and the UMF entity adds the first fresh parameter to the request message as the first verification parameter, so that the security function entity can verify whether the UMF entity requesting the key is a UMF entity that can obtain the key.

In a possible embodiment, the determining, by the security function entity, that a first verification parameter carried in the request message is valid includes: determining, by the security function entity, that the first verification parameter carried in the security context request is valid, if determining that the first verification parameter is the same as the fresh parameter or determining that the fresh parameter is within a specified range. In this embodiment, a validity of the first verification parameter is verified by using the fresh parameter.

In a possible embodiment, the request message further carries a second verification parameter, and the second verification parameter is generated by the UMF entity. The method further includes: returning, by the security function entity, a response message to the UMF entity, where the response message carries at least the key generated for the UMF entity and the second verification parameter, and information carried in the response message is encrypted by using the public key of the UMF entity; and after the UMF entity decrypts the response message by using a private key of the UMF entity, if determining that the second verification parameter carried in the response message is valid, determining that the key carried in the response message is the key generated by the security function entity for the UMF entity. In this embodiment, the UMF entity further determines, by verifying validity of the second verification parameter in the response message returned by the security function entity, that the key carried in the response message is a key of the UMF entity, thereby improving security.

According to a second aspect, an embodiment of this application provides a method for verifying a key requester, including: receiving, by a security function entity, a request message sent by a first core-network network element, where the request message carries an identifier of the first core-network network element, identity information of a UE, and a first token; and determining, by the security function entity, to provide the key for the first core-network network element if determining, based on the identifier of the first core-network network element and the identity information of the UE, that the first token is valid.

In the method, the security function entity verifies, whether the first token carried in the request message of the first core-network network element is valid, thereby verifying whether the UMF entity requesting the key is a UMF entity that can obtain the key.

In a possible embodiment, before the receiving, by a security function entity, a request message sent by a first core-network network element, the method further includes: generating, by the security function entity, a first fresh parameter; and sending, by the security function entity, the first fresh parameter to a second core-network network element, so that the second core-network network element generates the first token based on the identifier of the first core-network network element to which the UE attaches, the identity information of the UE, the first fresh parameter, and a shared key. In this embodiment, the core-network network element generates the first token with reference to the shared key and the first fresh parameter, so that the security function entity can verify, based on a locally stored parameter related to the core-network network element, whether the first token is valid.

In a possible embodiment, the shared key is generated by the security function entity and sent by the security function entity to the second core-network network element, or the shared key is generated by the security function entity and the second core-network network element individually.

In a possible embodiment, the determining, by the security function entity based on the identifier of the first core-network network element and the identity information of the UE, that the first token is valid includes: generating, by the security function entity, a second token based on the identifier of the first core-network network element, the identity information of the UE, the first fresh parameter corresponding to the first core-network network element, and the shared key; and determining that the first token is valid if determining that the first token is the same as the second token. In this embodiment, a manner used by the security function entity to generate a token is configured, so that the security function entity can verify, by using the token generated by the security function entity, whether the token sent by the core-network network element is valid.

In a possible embodiment, the first token is generated by a second core-network network element by using a private key of the second core-network network element, the identifier of the first core-network network element to which the UE attaches, the identity information of the UE, and a second fresh parameter.

In a possible embodiment, the determining, by the security function entity based on the identifier of the first core-network network element and the identity information of the UE, that the first token is valid includes: sending, by the security function entity, the identity information of the UE, the first token, and the identifier of the first core-network network element to the second core-network network element; and receiving, by the security function entity, a response message returned by the second core-network network element, where the response message is used to indicate that the first token is valid, and the response message is returned after the second core-network network element generates a second token based on the identity information of the UE, the identifier of the first core-network network element, the second fresh parameter corresponding to the identity information of the UE, and the private key of the second core-network network element that are provided by the security function entity, and determines that the first token is the same as the second token.

According to a third aspect, an embodiment of this application provides a method for verifying a key requester, including: obtaining, by a security function entity, an identifier of a user management function UMF entity to which a UE attaches; generating, by the security function entity, a key of the UE and a verification parameter for the UMF entity; sending, by the security function entity, configuration information to the UMF entity, where the configuration information is signed by using a private key of the security function entity and encrypted by using a public key of the UMF entity, and the configuration information includes the key, identity information of the UE, and the verification parameter; receiving, by the security function entity, verification information returned by the UMF entity, where the verification information is obtained by the UMF entity after the UMF entity encrypts the verification parameter by using the key; and determining, by the security function entity after determining that the verification information is valid, that the key is successfully delivered.

In the method, the security function entity actively delivers, to a requesting UMF entity, the key and the verification parameter generated for the UMF entity, receives the verification information returned by the UMF entity, and determines, after verifying that the verification information returned by the UMF entity is valid, that the key is successfully delivered, thereby verifying whether the UMF entity requesting the key is a UMF entity that can obtain the key, and simplifying a key configuration procedure.

According to a fourth aspect, an embodiment of this application provides a device for verifying a key requester. The device has a function of implementing the security function entity in the method embodiments of the first aspect, the second aspect, or the third aspect. The function may be implemented by hardware, or may be implemented by hardware executing corresponding software. The hardware or the software includes one or more modules corresponding to the foregoing function.

According to a fifth aspect, an embodiment of this application provides a device for verifying a key requester, including a processor, a memory, and a communications interface. The memory stores a preset program. The processor reads the program stored in the memory, and performs, based on the program, the method according to the first aspect, the second aspect, or the third aspect.

According to a sixth aspect, an embodiment of this application provides a system for verifying a key requester, including: a user management function UMF entity, configured to send a request message to a security function entity; and the security function entity, configured to: receive the request message sent by the UMF entity; decrypt information in the request message by using a private key of the security function entity, and obtain the information carried in the request message after signature verification on decrypted information by using a public key in a certificate of the UMF entity succeeds; and determine to provide a key of a UE for the UMF entity if determining that a first verification parameter carried in the request message is valid and determining that an identifier which is of the UMF entity and which is carried in the request message is the same as an identifier of a UMF entity to which the UE attaches.

According to a seventh aspect, an embodiment of this application provides a system for verifying a key requester, including: a first core-network network element, configured to send a request message to a security function entity, where the request message carries an identifier of the first core-network network element, identity information of a UE, and a first token; and the security function entity, configured to: receive the request message sent by the first core-network network element; and determine to provide the key for the first core-network network element if determining, based on the identifier of the first core-network network element and the identity information of the UE, that the first token is valid.

According to an eighth aspect, an embodiment of this application provides a system for verifying a key requester, including: a security function entity, configured to: obtain an identifier of a user management function UMF entity to which a UE attaches; generate a key of the UE and a verification parameter for the UMF entity; send configuration information to the UMF entity, where the configuration information is signed by using a private key of the security function entity and encrypted by using a public key of the UMF entity, and the configuration information includes the key, identity information of the UE, and the verification parameter; and the UMF entity, configured to: receive the configuration information sent by the security function entity, encrypt the verification parameter by using the key carried in the configuration information to obtain verification information, and send the verification information to the security function entity.

The security function entity is configured to determine, after receiving the verification information returned by the UMF entity, that the key is successfully delivered.

DESCRIPTION OF EMBODIMENTS

In an initial network access process for a 5G network, to verify whether a key requester is an entity that can obtain a key, embodiments of this application provide a method and device for verifying a key requester.

The following describes embodiments of this application in detail with reference to the accompanying drawings.

Figure 1:
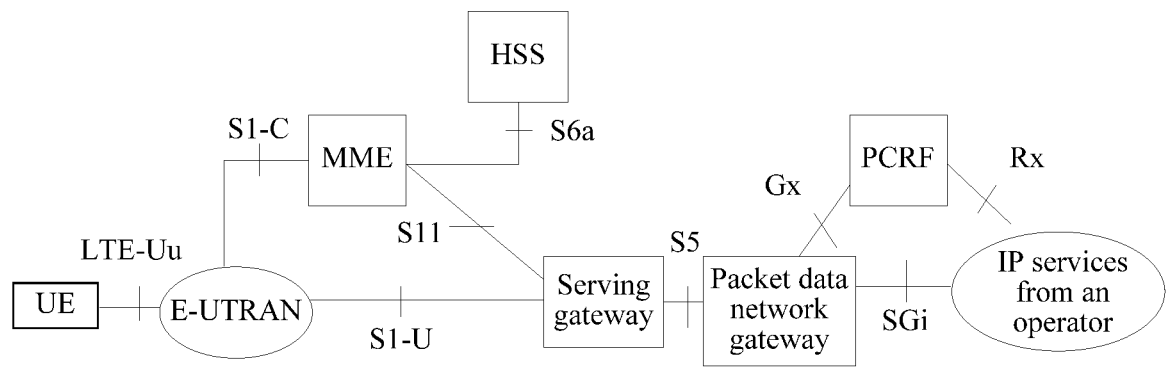
FIG. 1 is a schematic diagram of an LTE system architecture.
Figure 2:
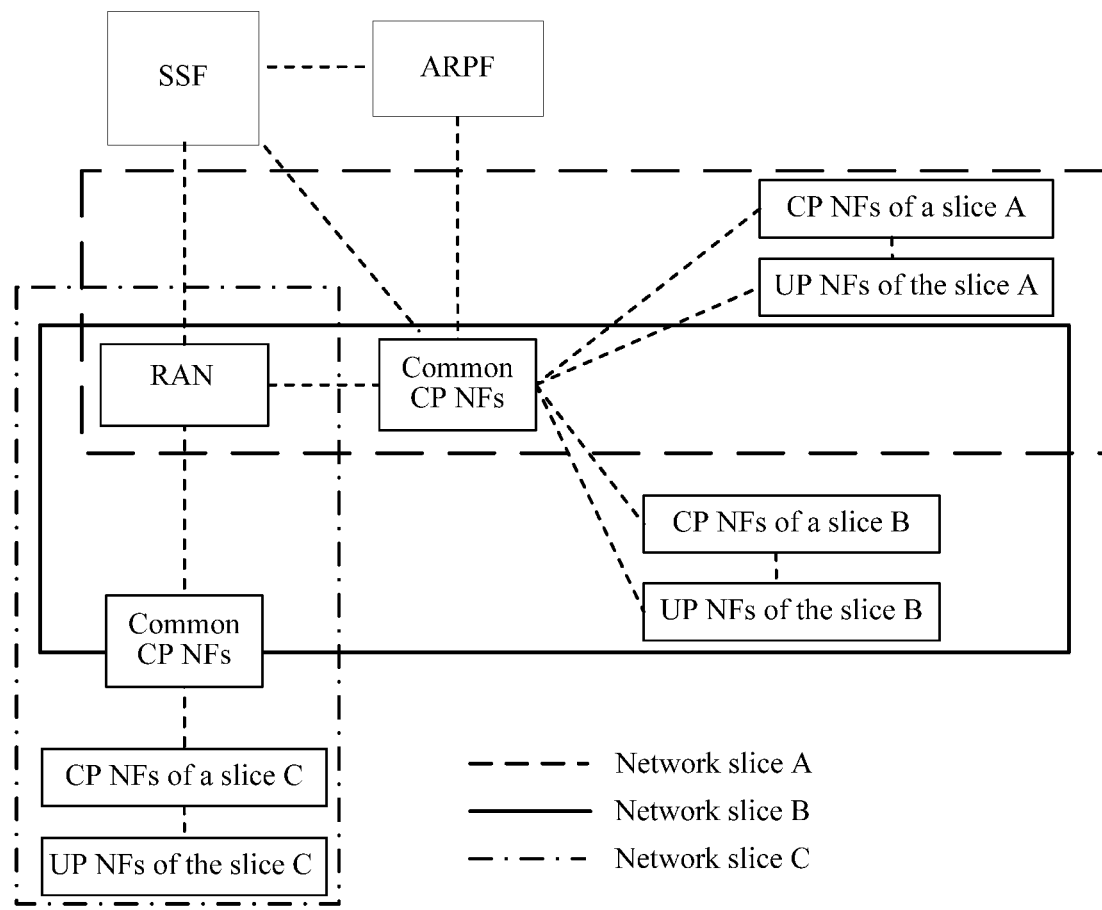
FIG. 2 is a schematic diagram of a 5G architecture.
Figure 3:
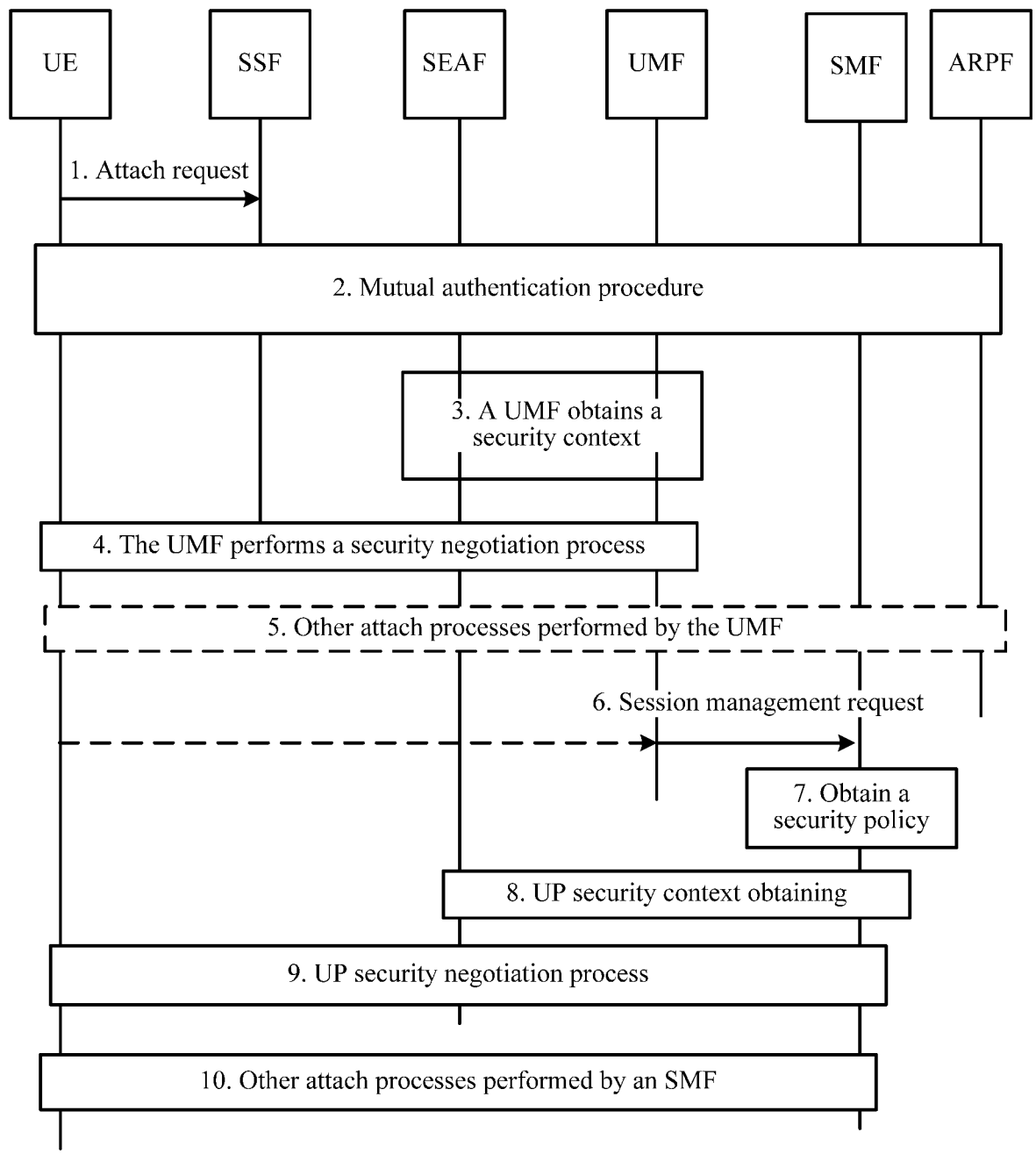
FIG. 3 is a schematic diagram of an existing 5G security procedure.
Figure 4:
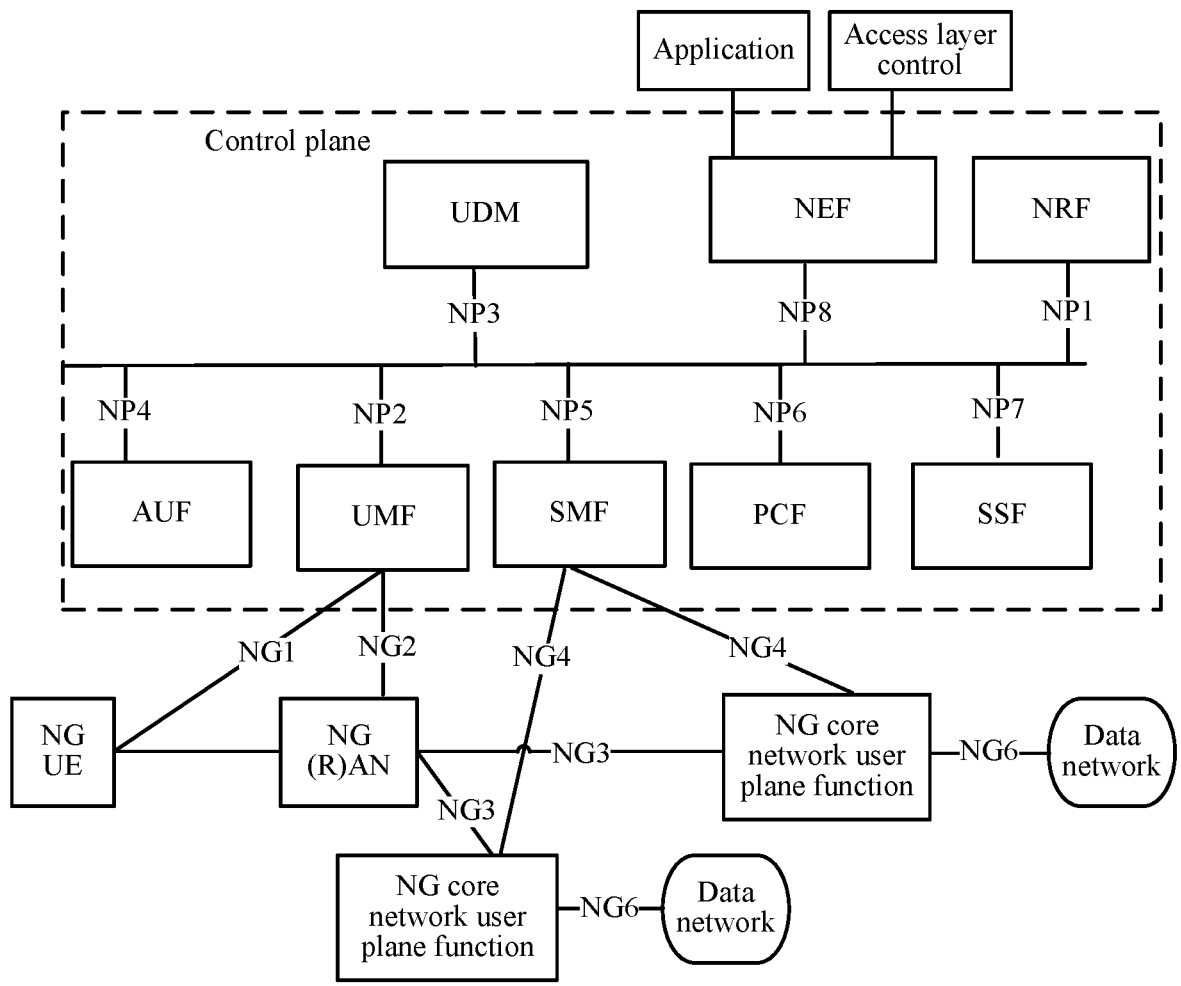
FIG. 4 is a schematic diagram of a system architecture according to an embodiment of this application.

A 5G system architecture on which the following embodiments are based is shown in FIG. 4. A control plane includes an AUF, a UMF, a session management function (SMF), a policy control function (PCF), an SSF, a UDM, a network exposure function (NEF), an NF repository function (NRF), and the like. The AUF may be further divided into entities such as a security anchor function (SEAF), a security context management function, a security policy management function (SPCF), and an authentication server function (AUSF). The SEAF entity is configured to interact with UE and an authentication server. An ARPF is a part of the UDM.

The entities described in the system architecture may be separately disposed on different devices. Alternatively, at least two entities are integrated on one device, and other entities are disposed on other devices. The at least two entities may be some or all entities described in the system architecture. In descriptions of the following embodiments, if at least two entities are integrated on one device, information exchange between the at least two entities should be understood as content exchange on the device.

The AUF serves as a security capability negotiation center, and the AUF, more specifically, the SEAF entity, the SCMF entity, or the AUSF entity, verifies whether a core-network network element (for example, a UMF entity) requesting a key is an entity that can obtain the key.

In the following embodiments, a security function entity may be the AUF entity in the 5G network, and specifically, may be the SCMF entity, the SEAF entity, or the AUSF entity in the AUF entity, may be an independent SEAF entity, may be an SEAF entity in the UMF, or may be an independent AUSF function entity. In the following embodiments, for the purpose of convenience, only an SSF logic function is drawn, and the SSF logic function may be an independent SSF entity, or may be an entity having an SSF function, for example, a UMF entity. The UMF entity is an entity managing mobility of UE, and is similar to an MME in LTE. The UMF entity is referred to as an MM entity in an initial design stage of 5G, and is referred to as an AMF entity in a later stage.

In the following embodiments, a UMF entity to which UE attaches is a UMF entity to which the UE finally attaches instead of a default UMF entity that the UE accesses during initial attachment.

Figure 5:
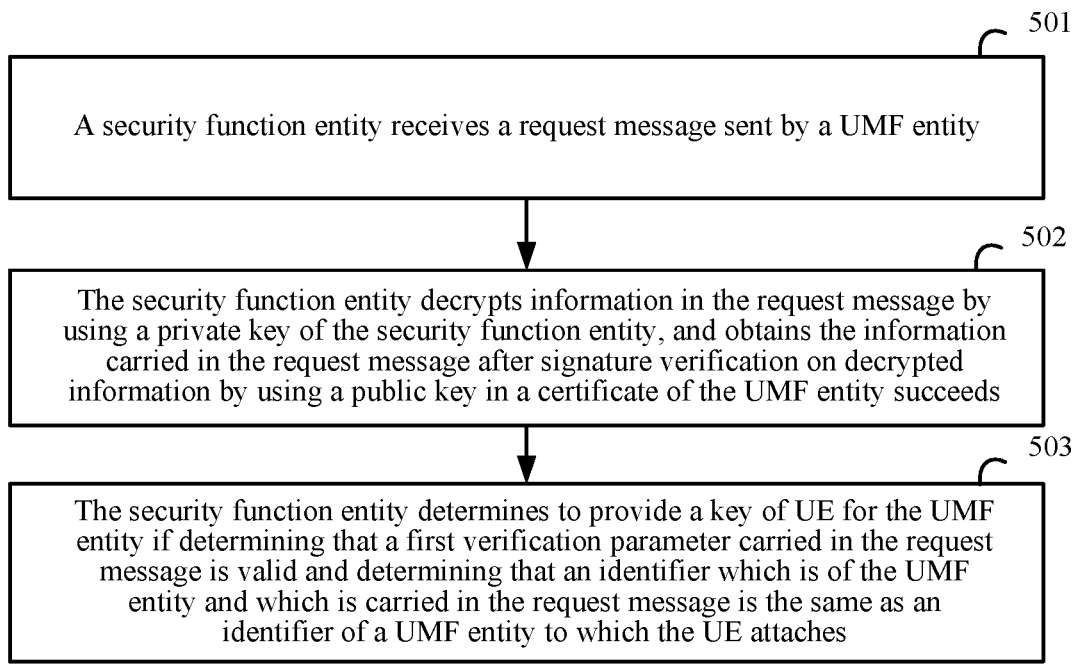
FIG. 5 is a schematic flowchart of verifying a key requester according to a first embodiment of this application.

In a first embodiment of this application, as shown in FIG. 5, a detailed method procedure of verifying a key requester is as follows:

Step 501. A security function entity receives a request message sent by a UMF entity.

Step 502. The security function entity decrypts information in the request message by using a private key of the security function entity, and obtains the information carried in the request message after signature verification on decrypted information by using a public key in a certificate of the UMF entity succeeds.

Step 503. The security function entity determines to provide a key of UE for the UMF entity if determining that a first verification parameter carried in the request message is valid and determining that an identifier which is of the UMF entity and which is carried in the request message is the same as an identifier of a UMF entity to which the UE attaches.

In the first embodiment of this application, based on different manners of obtaining the first verification parameter carried in the request message, there are at least two specific embodiments as follows:

In a first embodiment, the security function entity obtains the identifier that is of the UMF entity to which the UE attaches and that is provided by a core-network network element. The UMF entity to which the UE attaches is a UMF entity to which the UE finally attaches instead of a default UMF entity that the UE accesses during initial attachment. The security function entity generates a first fresh parameter corresponding to the identifier of the UMF entity to which the UE attaches. The security function entity notifies the UMF entity to which the UE attaches of the first fresh parameter by using the core-network network element. Optionally, the security function entity also notifies the UMF entity to which the UE attaches of a certificate of the security function entity. The UMF entity may alternatively obtain a certificate of the security function entity in another manner. The UMF entity to which the UE attaches adds the first fresh parameter to the request message as the first verification parameter. For example, the first fresh parameter may be a random number, a counter value, a current time, or a derived value of a current time. It should be noted that a specific form of the first fresh parameter is not limited herein.

In this specific embodiment, if determining that the first verification parameter is the same as or close to the first fresh parameter, the security function entity determines that the first verification parameter carried in the security context request is valid.

Specifically, the core-network network element may be an AMF entity or an entity having an SSF function.

In a second embodiment, before receiving the request message sent by the user management function UMF entity, the security function entity generates a second fresh parameter, and the security function entity sends, by using a core-network network element, the second fresh parameter to the UMF entity to which the UE attaches. Optionally, the security function entity also notifies the UMF entity to which the UE attaches of a certificate of the security function entity. The UMF entity may alternatively obtain a certificate of the security function entity in another manner. The UMF entity to which the UE attaches adds the second fresh parameter to the request message as the first verification parameter.

It should be noted that a specific form of the second fresh parameter is not limited herein. For example, the second fresh parameter may be a random number, a timestamp, a derived value of a timestamp, a counter value, or the like.

In a specific embodiment, the second fresh parameter is valid within a specified range. In this case, the security function entity determines that the first verification parameter carried in the request message is valid if determining that the second fresh parameter is within the specified range. For example, the second fresh parameter is a timestamp. In this case, the security function entity determines that the first verification parameter carried in the request message is valid if determining that the timestamp is within a set time range, that is, the timestamp has not expired.

In a specific embodiment, the request message further carries a second verification parameter, and the second verification parameter is generated by the UMF entity.

It should be noted that if the first verification parameter and the second verification parameter belong to a same type, for example, both are random numbers, it should be ensured that values of the first verification parameter and the second verification parameter are different.

In this specific embodiment, the security function entity returns a response message to the UMF entity, where the response message carries at least the key generated for the UMF entity and the second verification parameter, and information carried in the response message is encrypted by using the public key of the UMF entity; and after the UMF entity decrypts the response message by using a private key of the UMF entity, if determining that the second verification parameter carried in the response message is valid, determines that the key carried in the response message is the key generated by the security function entity for the UMF entity.

The process of verifying a key requester provided in the first embodiment of this application is described in detail below by using two specific embodiments.

Figure 6:
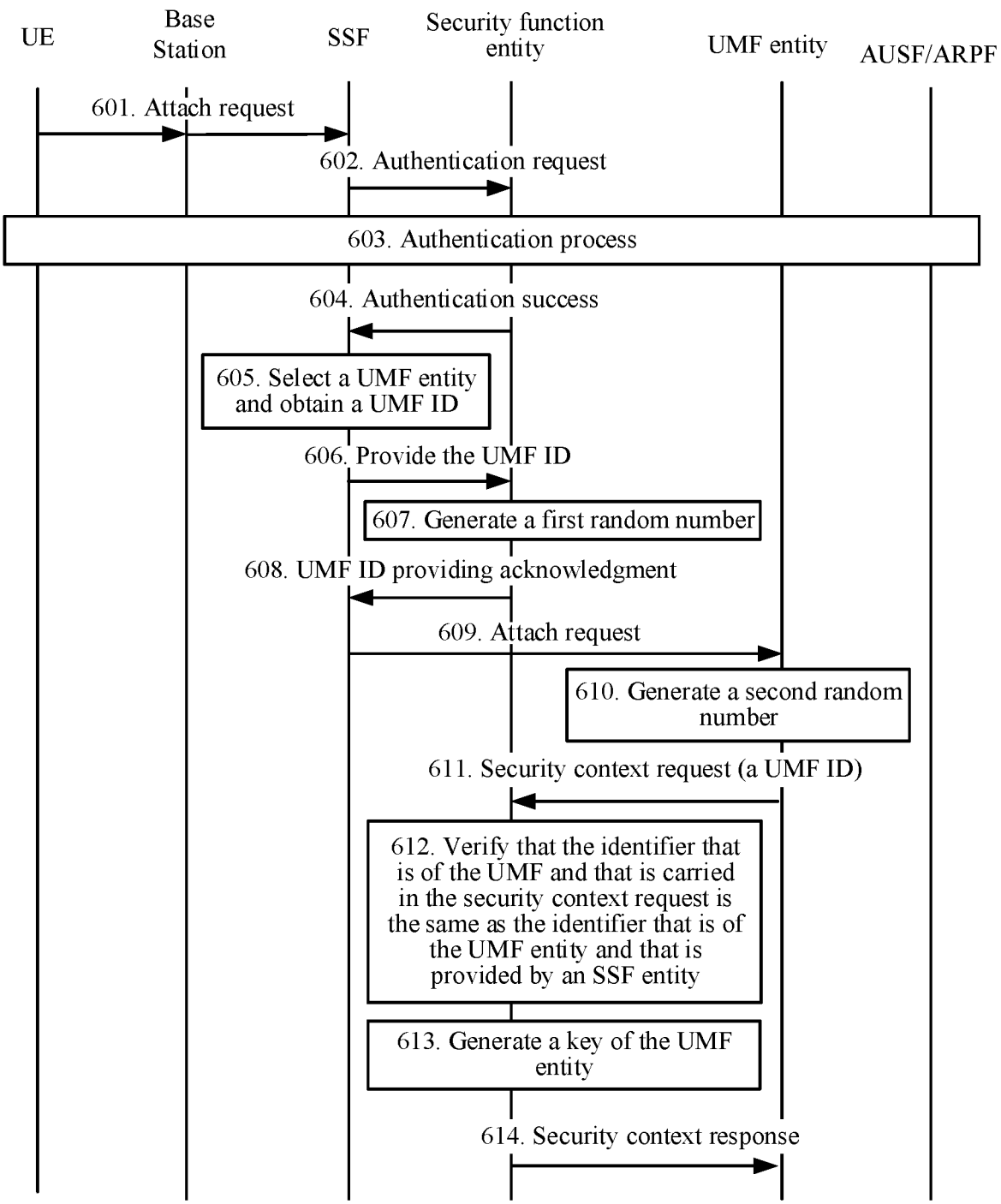
FIG. 6 is a schematic flowchart of verifying a key requester according to a specific embodiment 1 of this application.

In a specific embodiment 1, a specific process of verifying a key requester is shown in FIG. 6, and specific descriptions are as follows:

Step 601. The UE sends an initial attach request to an SSF entity through forwarding by a base station, where the initial attach request carries at least an IMSI of the UE.

Step 602. The SSF entity initiates an authentication request to the security function entity.

Step 603. The security function entity initiates an authentication process for the UE, to complete authentication on the UE.

Step 604. The security function entity sends an authentication success message to the SSF entity.

Step 605. The SSF entity selects a suitable UMF entity for the UE based on information about the UE, and obtains identification information of the UMF entity, where the SSF may check subscription information of the UE to search for the suitable UMF entity for the UE.

Step 606. The SSF entity sends, to the security function entity, an identifier of the UMF entity selected for the UE, where the identifier of the UMF entity may be identity information allocated by an operator to each UMF or address information of the UMF, and, all in all, is an identifier that can uniquely identify the UMF, and the identifier may be an identifier that is unique within a range of an operator or in the world.

Step 607. The security function entity generates a first random number.

Step 608. The security function entity returns an acknowledgment message to the SSF entity, where the acknowledgment message carries at least the first random number and an identifier of the UE. Optionally, the acknowledgment message further carries a certificate of the security function entity.

Step 609. The SSF entity forwards the initial attach request to the UMF entity, where the first random number is added to the initial attach request. Optionally, the initial attach request further carries the certificate of the security function entity.

Step 610. The UMF entity generates a second random number.

Step 611. The UMF entity generates a security context request, where the security context request carries an identifier of the UMF entity, the identifier of the UE, the first random number, and the second random number. After the security context request is signed by using a private key of the UMF entity, where optionally, the security context request further carries a certificate of the UMF entity; encrypts the security context request by using a public key of the security function entity; and sends the security context request to the security function entity.

Step 612. The security function entity receives the security context request sent by the UMF entity, and uses the private key of the security function entity to decrypt the security context request, verify whether a signature of the security context request is correct, and verify whether the identifier that is of the UMF and that is carried in the security context request is the same as the identifier that is of the UMF entity and that is provided by the SSF entity.

Step 613. The security function entity generates a key (Kmm) of the UMF entity when determining that the security context request is successfully decrypted by using the private key of the security function entity, verifying that the signature of the security context request is correct, and verifying that the identifier that is of the UMF and that is carried in the security context request is the same as the identifier that is of the UMF entity and that is provided by the SSF entity.

Step 614. The security function entity sends a security context response to the UMF entity, where the security context response carries the second random number and the key that is encrypted by using the public key of the UMF, so that the UMF entity verifies, based on the second random number, whether the key carried in the security context response is the key allocated to the UMF entity.

In the specific embodiment 1, the security function entity verifies whether the UMF entity requesting the key is the UMF entity to which the SSF entity forwards a message, and when sending the key to the UMF entity, uses the public key of the UMF entity to perform encryption protection, so as to verify, without depending on a secure connection between underlying network elements, whether the key requester is an entity that can obtain the key.

Figure 7:
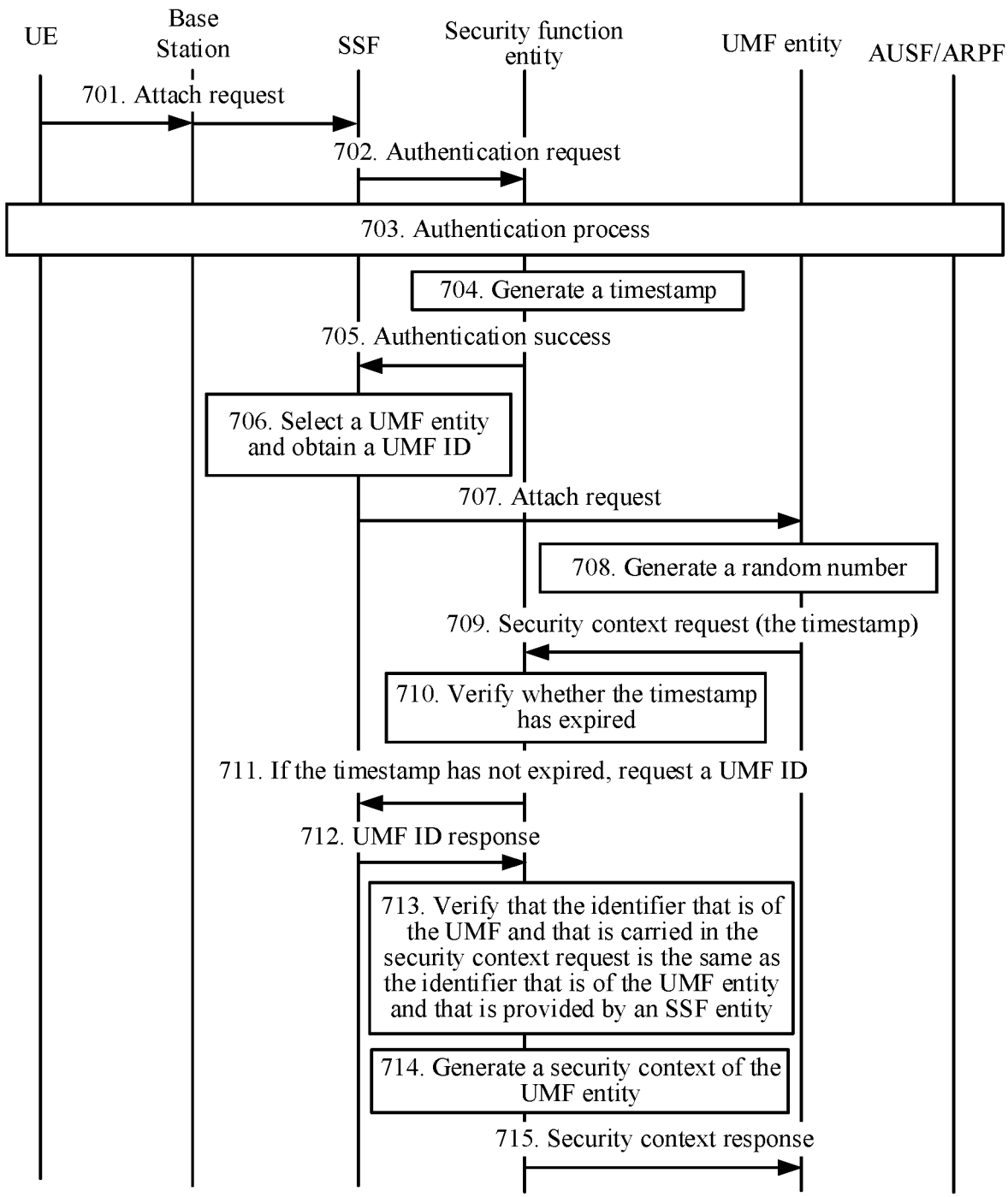
FIG. 7 is a schematic flowchart of verifying a key requester according to a specific embodiment 2 of this application.

In a specific embodiment 2, a specific process of verifying a key requester is shown in FIG. 7, and specific descriptions are as follows:

In this specific embodiment, an authentication process described in step 701 to step 703 is the same as that in the specific embodiment 1. For details, refer to the descriptions in step 601 to step 603 in the specific embodiment 1, and details are not described herein. The following only describes a process after the authentication.

Step 704. The security function entity generates a timestamp.

Step 705. The security function entity sends an authentication success message to the SSF entity, where the authentication success message includes the generated timestamp. Optionally, the authentication success message further carries a certificate of the security function entity.

Step 706. The SSF entity selects a suitable UMF entity for the UE based on information about the UE, and obtains an identifier of the selected UMF entity.

Step 707. The SSF entity forwards an attach request to the UMF entity, where the attach request includes the timestamp. Optionally, the attach request further includes the certificate of the security function entity, and the certificate of the security function entity includes a public key.

Step 708. The UMF entity generates a random number.

Step 709. The UMF entity sends a security context request to the security function entity, where the security context request is encrypted by using the public key of the security function entity, and the security context request carries an identifier of the UMF entity, the timestamp, and the random number. Optionally, the security context request further carries a certificate of the UMF entity, and the security context request is signed by using a private key of the UMF entity.

Step 710. After verifying that a signature of the security context request is correct and successfully decrypting the security context request by using the private key of the security function entity, the security function entity verifies whether the timestamp has expired, and if the timestamp has expired, the security function entity does not process the security context request, and informs the SSF entity that the timestamp has expired.

Step 711. If determining that the timestamp has not expired, the security function entity sends a request message including the identifier of the UMF entity (the UMF ID Request) to the SSF entity, where the request message carries an identifier of the UE.

Step 712. The SSF entity sends the identifier of the UMF entity to the security function entity.

Step 713. The security function entity verifies whether the identifier of the UMF entity carried by the security context request is the same as the identifier that is of the UMF entity and that is provided by the SSF entity.

Step 714. If determining that the identifier of the UMF entity carried by the security context request is the same as the identifier that is of the UMF entity and that is provided by the SSF entity, the security function entity generates a security context of the UMF entity.

Step 715. The security function entity returns a security context response message to the UMF entity, where the security context response message is encrypted by using a public key of the UMF entity, and the security context response message carries the security context and the random number.

In the specific embodiment 2, the security function entity may control, by using the timestamp, a time of starting external receiving. In this specific embodiment, although a window of the timestamp is open to a plurality of UMF entities, the security function entity can know UE to which the window is open. Whether a key requester is an entity that can obtain a key can also be verified through such a limitation.

Figure 8:
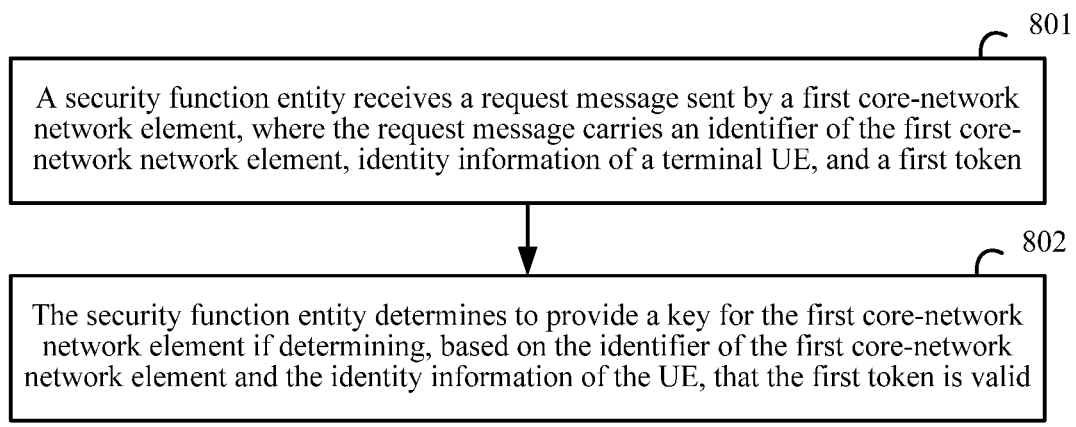
FIG. 8 is a schematic flowchart of verifying a key requester according to a second embodiment of this application.

In a second embodiment of this application, as shown in FIG. 8, a process of verifying a key requester is specifically as follows:

Step 801. A security function entity receives a request message sent by a first core-network network element, where the request message carries an identifier of the first core-network network element, identity information of a UE, and a first token.

Step 802. The security function entity determines to provide the key for the first core-network network element if determining, based on the identifier of the first core-network network element and the identity information of the UE, that the first token is valid.

In a specific embodiment of the second embodiment of this application, before the receiving, by a security function entity, a request message sent by a first core-network network element, the security function entity generates a first fresh parameter, and sends the first fresh parameter to a second core-network network element, so that the second core-network network element generates the first token based on the identifier of the first core-network network element to which the UE attaches, the identity information of the UE, the first fresh parameter, and a shared key.

The shared key is generated by the security function entity and sent by the security function entity to the second core-network network element, or the shared key is generated by the security function entity and the second core-network network element individually.

During specific the embodiment, the security function entity generates a second token based on the identifier of the first core-network network element, the identity information of the UE, the first fresh parameter corresponding to the first core-network network element, and the shared key; and determines that the first token is valid if determining that the first token is the same as the second token.

In another specific embodiment of the second embodiment of this application, the first token is generated by a second core-network network element by using a private key of the second core-network network element, the identifier of the first core-network network element to which the UE attaches, the identity information of the UE, and a second fresh parameter.

During specific embodiment, the security function entity sends the identity information of the UE, the first token, and the identifier of the first core-network network element to the second core-network network element. The security function entity receives a response message returned by the second core-network network element. The response message is used to indicate that the first token is valid, and the response message is returned after the second core-network network element generates a second token based on the identity information of the UE, the identifier of the first core-network network element, the second fresh parameter corresponding to the identity information of the UE, and the private key of the second core-network network element that are provided by the security function entity, and determines that the first token is the same as the second token.

In the second embodiment of this application, the first core-network network element is a UMF entity, the second core-network network element is an AMF entity or an entity having an SSF function.

The process of verifying a key requester provided in the second embodiment of this application is described in detail below by using two specific embodiments.

Figure 9:
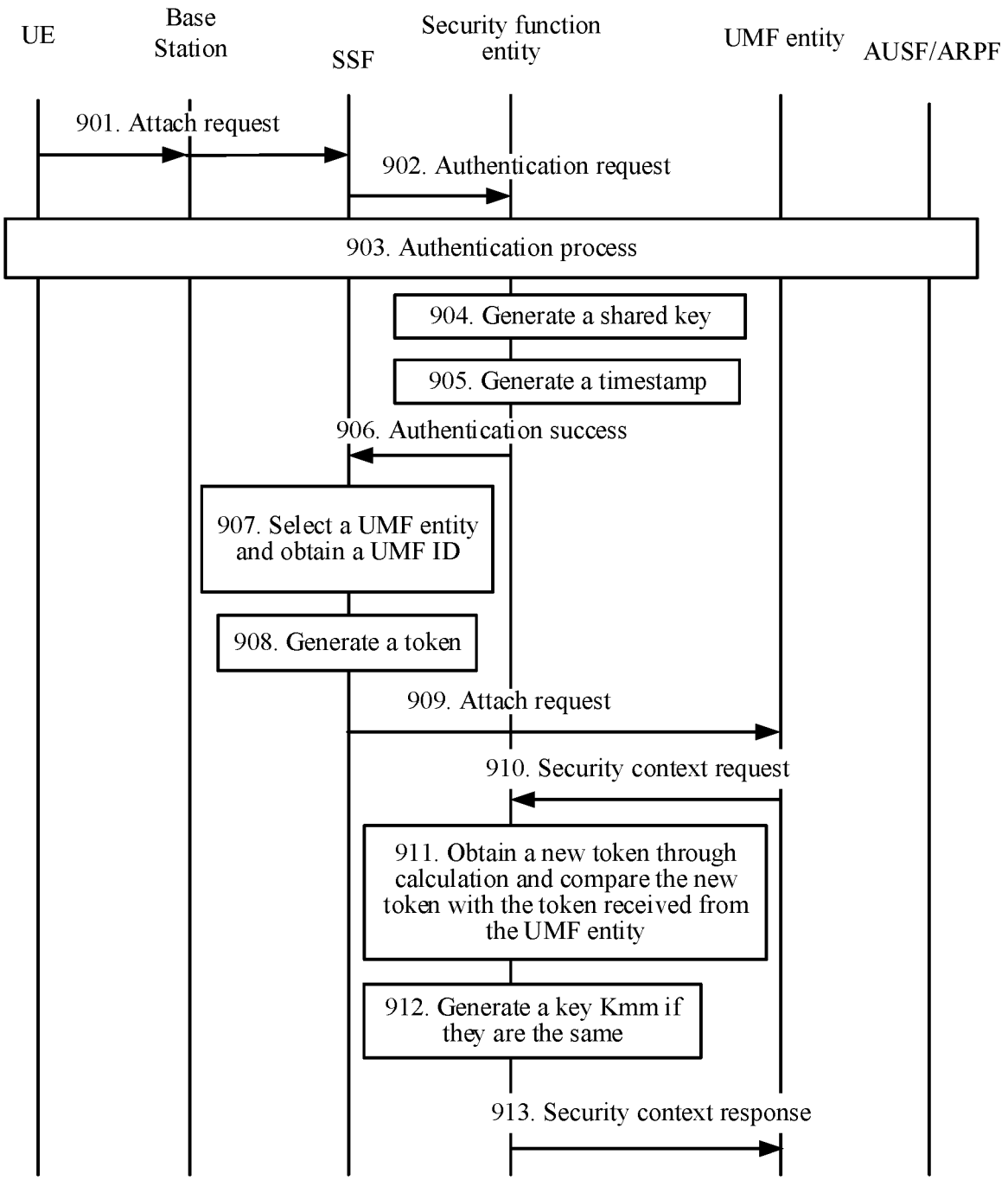
FIG. 9 is a schematic flowchart of verifying a key requester according to a specific embodiment 3 of this application.

In a specific embodiment 3, a specific process of verifying a key requester is shown in FIG. 9, and specific descriptions are as follows:

In this specific embodiment, an authentication process described in step 901 to step 903 is the same as that in the specific embodiment 1. For details, refer to the descriptions in step 601 to step 603, and details are not repeated herein. The following only describes a process after the authentication.

Step 904. The security function entity generates a shared key, represented as Kssf, between the security function entity and the SSF entity.

Step 905. The security function entity generates a timestamp.

Step 906. The security function entity sends an authentication success message to the SSF entity, where the authentication success message carries the timestamp. Optionally, the authentication success message further carries a shared key Kssf of the SSF entity, and the shared key is generated by the security function entity, or the shared key Kssf of the SSF entity may be generated by the SSF entity or an entity having an SSF function.

Step 907. The SSF entity selects a suitable UMF entity and obtains an identifier of the UMF entity.

Step 908. The SSF entity generates a token, where a parameter for generating the token includes the identity information of the UE, the identifier of the UMF, the timestamp, and the shared key.

Step 909. The SSF entity forwards an attach message to the UMF entity, where the attach message carries the identity information of the UE and the token.

Step 910. The UMF entity sends a security context request to the security function entity, where the security context request carries the identifier of the UMF entity, the identity information of the UE, and the token.

Step 911. The security function entity obtains a new token through calculation based on information carried in the security context request, and compares the new token with the token received from the UMF entity.

Step 912. Generate a key Kmm if the new token is the same as the token received from the UMF entity.

Step 913. The security function entity sends a security context response to the UMF entity, where the security context response carries a security context, that is, the key Kmm and a KSI.

In the specific embodiment 3, the SSF entity and the security function entity separately generate the tokens, the security function entity determines, by verifying whether the two tokens are the same, whether a key requester is an entity that can obtain a key. This specific embodiment needs to depend on secure protection of underlying network elements. However, compared with other specific embodiments, a process in which the security function entity and the SSF entity interact with each other to obtain the identifier of the UMF is reduced.

Figure 10:
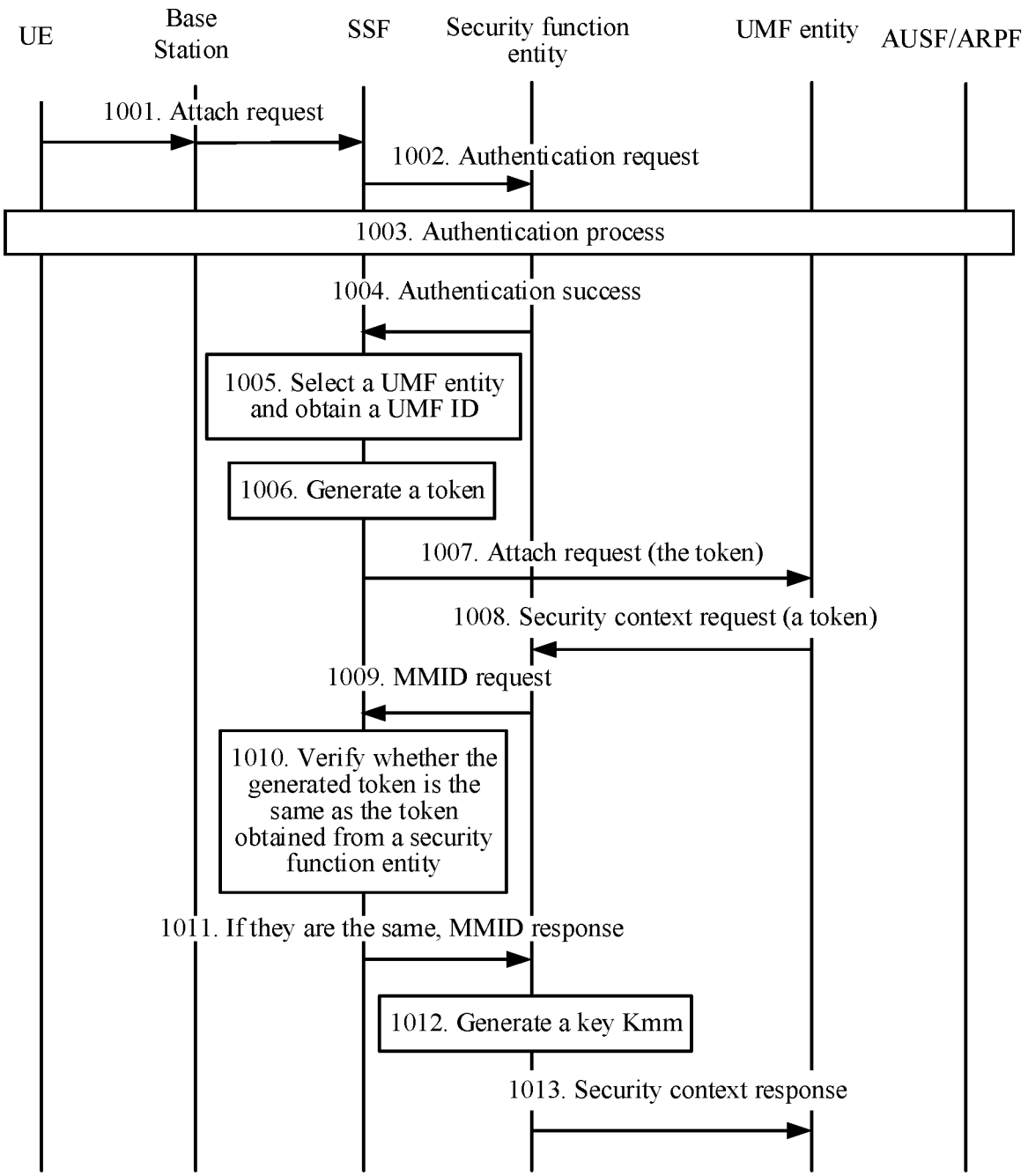
FIG. 10 is a schematic flowchart of verifying a key requester according to a specific embodiment 4 of this application.

In a specific embodiment 4, a specific process of verifying a key requester is shown in FIG. 10, and specific descriptions are as follows:

In this specific embodiment, an authentication process described in step 1001 to step 1004 is the same as that in the specific embodiment 1, and details are not repeated herein. The following only describes a process after the authentication.

Step 1005. The SSF entity selects a suitable UMF entity, obtains an identifier of the UMF entity, and generates a random number.

Step 1006. The SSF entity generates a token by using a private key of the SSF entity, the identifier of the UMF entity, the identity information of the UE, and the random number.

Step 1007. The SSF entity forwards an attach request to the UMF entity, where the attach request carries the generated token.

Step 1008. The UMF entity sends a security context request to the security function entity, where the security context request carries the identifier of the UMF, a token, and the identity information of the UE.

Step 1009. The security function entity sends a request message including the identifier of the UMF to the SSF entity, where the request message carries the identity information of the UE, the token, and the identifier of the UMF entity.

Step 1010. The SSF entity verifies whether the generated token is the same as the token obtained from the security function entity.

Step 1011. The SSF entity returns a response message to the security function entity if determining that the two tokens are the same, where the response message carries indication information indicating that the tokens are the same.

Step 1012. The security function entity generates a context, for example, a key Kmm, related to the UMF entity.

Step 1013. The security function entity returns a security context response message to the UMF entity, where the security context response message carries the context related to the UMF entity.

In the specific embodiment 4, the token is generated by using the private key of the SSF entity, and the SSF entity verifies whether the generated token is the same as the token obtained from the security function entity. In this way, the security function entity unconditionally believes that information fed back by the SSF entity is correct. This specific embodiment needs to depend on secure protection of underlying network elements.

Figure 11:
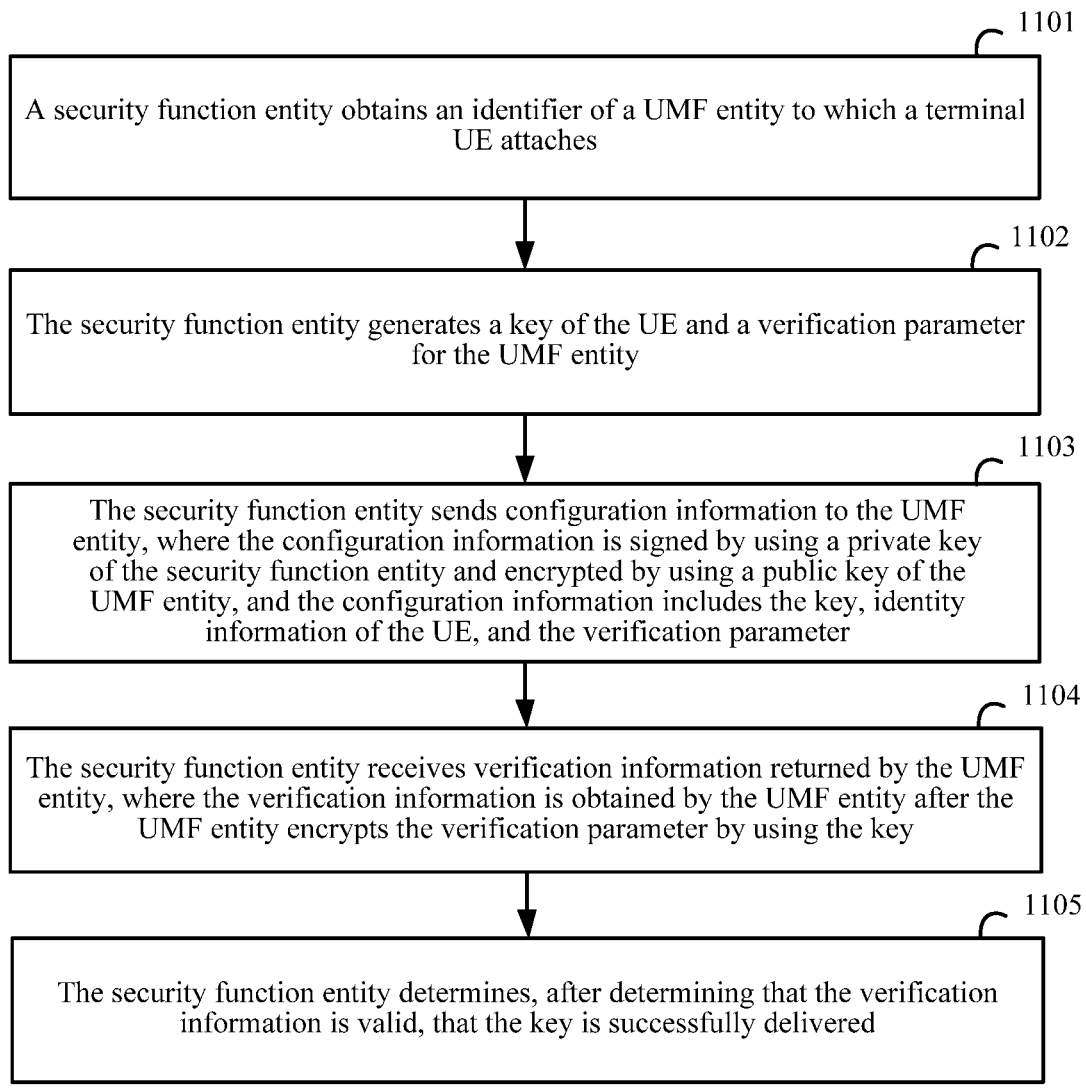
FIG. 11 is a schematic flowchart of verifying a key requester according to a third embodiment of this application.

In a third embodiment of this application, as shown in FIG. 11, a process of verifying a key requester is specifically as follows:

Step 1101. A security function entity obtains an identifier of a UMF entity to which a UE attaches.

Step 1102. The security function entity generates a key of the UE and a verification parameter for the UMF entity.

Step 1103. The security function entity sends configuration information to the UMF entity, where the configuration information is signed by using a private key of the security function entity and encrypted by using a public key of the UMF entity, and the configuration information includes the key, identity information of the UE, and the verification parameter.

Step 1104. The security function entity receives verification information returned by the UMF entity, where the verification information is obtained by the UMF entity after the UMF entity encrypts the verification parameter by using the key.

Step 1105. The security function entity determines, after determining that the verification information is valid, that the key is successfully delivered.

The process of verifying a key requester provided in the third embodiment of this application is described in detail below by using a specific embodiment.

Figure 12:
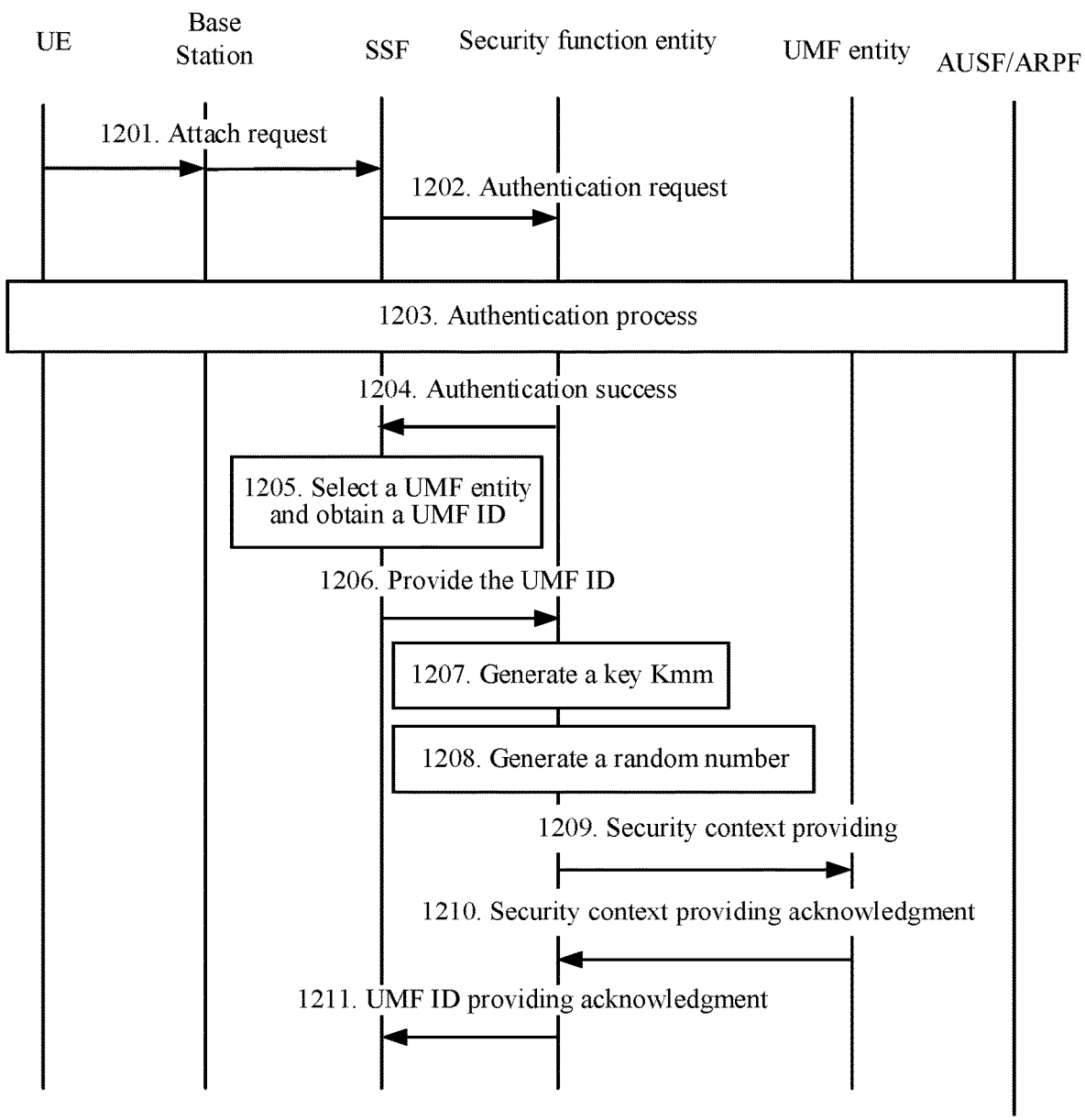
FIG. 12 is a schematic flowchart of verifying a key requester according to a specific embodiment 5 of this application.

In a specific embodiment 5, a specific process of verifying a key requester is shown in FIG. 12, and specific descriptions are as follows:

Step 1201. The UE sends an initial attach request to an SSF entity through forwarding by a base station, where the initial attach request carries at least an IMSI of the UE.

Step 1202. The SSF entity forwards the initial attach request to the security function entity, to initiate an authentication request.

Step 1203. The security function entity initiates an authentication process for the UE, to complete authentication on the UE.

Step 1204. The security function entity sends an authentication success message to the SSF entity.

Step 1205. The SSF entity selects a suitable UMF entity for the UE based on information about the UE, and obtains identification information of the UMF entity.

Step 1206. The SSF entity sends a UMF identifier providing message to the security function entity, where the UMF identifier providing message carries the identification information of the selected UMF entity and a certificate of the UMF entity.

Step 1207. The security function entity generates a key, for example, Kmm, related to the UMF entity.

Step 1208. The security function entity generates a random number.

Step 1209. The security function entity obtains a public key of the UMF entity based on an identifier of the UMF entity, and sends a security context providing message to the UMF entity, where the security context providing message is encrypted by using the public key of the UMF entity and is signed by using a private key of the security function entity, the security context providing message carries a security context (including the key related to the UMF entity) of the UMF entity, identity information of the UE, and the random number.

Step 1210. The UMF entity encrypts the random number by using the key received from the security function entity, and returns a security context providing acknowledgment message to the security function entity, where the message carries encrypted data.

Step 1211. After decrypting the received data by using the key of the UMF entity, the security function entity verifies whether decrypted data is the same as the generated random number, and if the decrypted data is the same as the generated random number, returns a UMF identifier providing acknowledgment message to the SSF entity, to notify the SSF entity that the key is successfully delivered.

Figure 13:
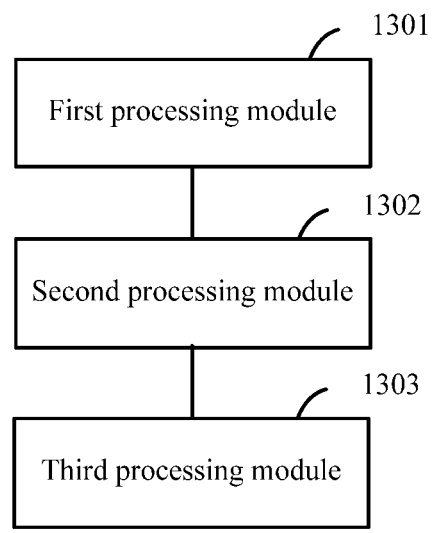
FIG. 13 is a schematic structural diagram of a device for verifying a key requester according to a fourth embodiment of this application.

Based on a same concept, a fourth embodiment of this application provides a device for verifying a key requester. For a specific embodiment of the device, refer to the descriptions in the first embodiment of this application, and repeated parts are not described again. As shown in FIG. 13, the device includes:

a first processing module 1301, configured to receive a request message sent by a user management function UMF entity;

a second processing module 1302, configured to: decrypt information in the request message by using a private key of the device, and obtain the information carried in the request message after signature verification on decrypted information by using a public key in a certificate of the UMF entity succeeds; and a third processing module 1303, configured to: determine to provide a key of a UE for the UMF entity if determining that a first verification parameter carried in the request message is valid and determining that an identifier which is of the UMF entity and which is carried in the request message is the same as an identifier of a UMF entity to which the UE attaches.

Figure 14:
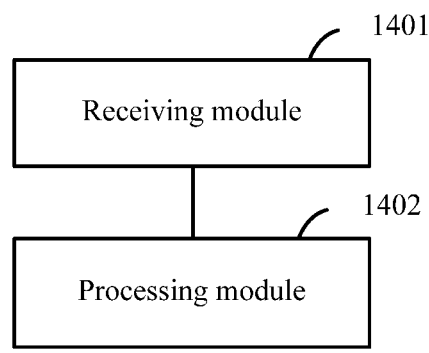
FIG. 14 is a schematic structural diagram of a device for verifying a key requester according to a fifth embodiment of this application.

Based on a same concept, a fifth embodiment of this application provides a device for verifying a key requester. For a specific embodiment of the device, refer to the descriptions in the second embodiment of this application, and repeated parts are not described again. As shown in FIG. 14, the device includes:

a receiving module 1401, configured to receive a request message sent by a first core-network network element, where the request message carries an identifier of the first core-network network element, identity information of a UE, and a first token; and a processing module 1402, configured to determine to provide the key for the first core-network network element if determining, based on the identifier of the first core-network network element and the identity information of the UE, that the first token is valid.

Figure 15:
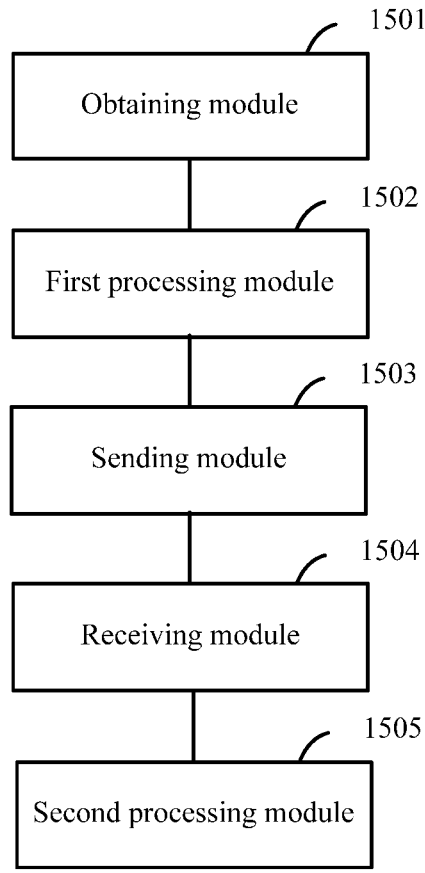
FIG. 15 is a schematic structural diagram of a device for verifying a key requester according to a sixth embodiment of this application.

Based on a same concept, a fifth embodiment of this application provides a device for verifying a key requester. For a specific embodiment of the device, refer to the descriptions in the third embodiment of this application, and repeated parts are not described again. As shown in FIG. 15, the device includes:

an obtaining module 1501, configured to obtain an identifier of a user management function UMF entity to which a UE attaches;

a first processing module 1502, configured to generate a key of the UE and a verification parameter for the UMF entity;

a sending module 1503, configured to send configuration information to the UMF entity, where the configuration information is signed by using a private key of the security function entity and encrypted by using a public key of the UMF entity, and the configuration information includes the key, identity information of the UE, and the verification parameter;

a receiving module 1504, configured to receive verification information returned by the UMF entity, where the verification information is obtained by the UMF entity after the UMF entity encrypts the verification parameter by using the key; and a second processing module 1505, configured to determine, after determining that the verification information is valid, that the key is successfully delivered.

Figure 16:
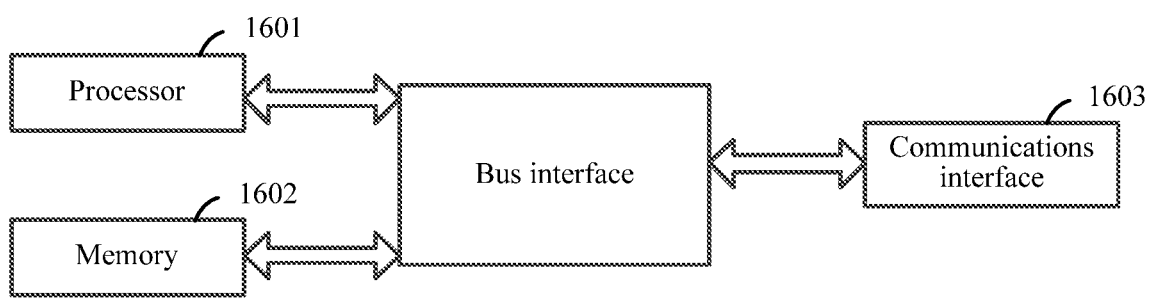
FIG. 16 is a schematic structural diagram of a device for verifying a key requester according to a seventh embodiment of this application.

Based on a same concept, a seventh embodiment of this application provides a device for verifying a key requester. For a specific embodiment of the device, refer to the related descriptions in the first embodiment of this application, and repeated parts are not described again. As shown in FIG. 16, the device includes a processor 1601, a memory 1602, and a communications interface 1603. The memory 1602 stores a preset program. The processor 1601 reads the program in the memory 1602, and performs the following processes based on the program:

receiving, by using the communications interface, a request message sent by a user management function UMF entity;

decrypting information in the request message by using a private key of the device, and obtaining the information carried in the request message after signature verification on decrypted information by using a public key in a certificate of the UMF entity succeeds; and determining to provide a key of a UE for the UMF entity, if determining that a first verification parameter carried in the request message is valid and determining that an identifier which is of the UMF entity and which is carried in the request message is the same as an identifier of a UMF entity to which the UE attaches.

Specifically, the processor is configured to perform functions of the first processing module, the second processing module, and the third processing module in the fourth embodiment, and the communications interface is configured to complete, under control of the processor, communication functions related to a processing process of the processing modules in the fourth embodiment.

Figure 17:
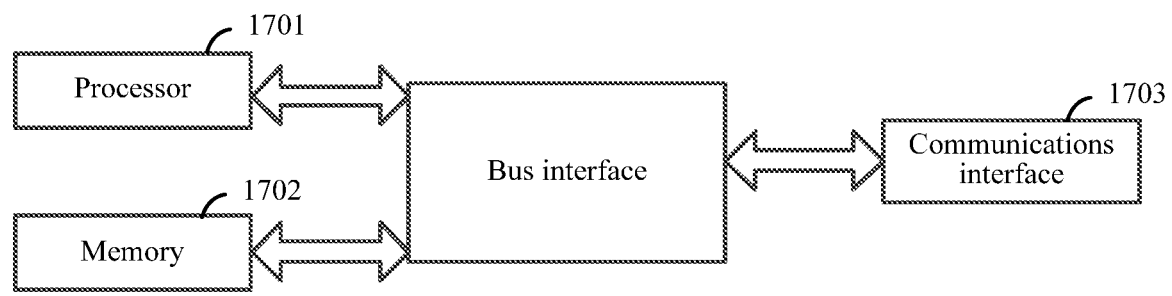
FIG. 17 is a schematic structural diagram of a device for verifying a key requester according to an eighth embodiment of this application.

Based on a same concept, an eighth embodiment of this application provides a device for verifying a key requester. For a specific embodiment of the device, refer to the related descriptions in the second embodiment of this application, and repeated parts are not described again. As shown in FIG. 17, the device includes a processor 1701, a memory 1702, and a communications interface 1703. The memory 1702 stores a preset program. The processor 1701 reads the program in the memory 1702, and performs the following processes based on the program:

receiving, by using the communications interface, a request message sent by a first core-network network element, where the request message carries an identifier of the first core-network network element, identity information of a UE, and a first token; and determining to provide the key for the first core-network network element if determining, based on the identifier of the first core-network network element and the identity information of the UE, that the first token is valid.

Specifically, the processor is configured to perform a function of the processing module in the fifth embodiment, and the communications interface is configured to complete, under control of the processor, a function of the receiving module in the fifth embodiment.

Figure 18:
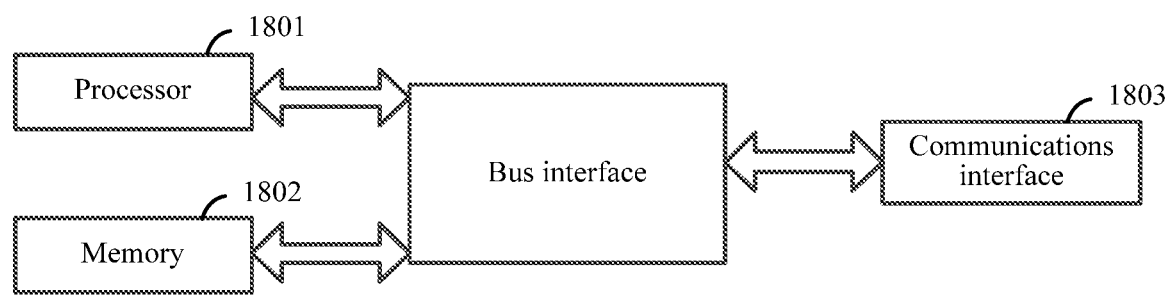
FIG. 18 is a schematic structural diagram of a device for verifying a key requester according to a ninth embodiment of this application.

Based on a same concept, a ninth embodiment of this application provides a device for verifying a key requester. For a specific embodiment of the device, refer to the related descriptions in the second embodiment of this application, and repeated parts are not described again. As shown in FIG. 18, the device includes a processor 1801, a memory 1802, and a communications interface 1803. The memory 1802 stores a preset program. The processor 1801 reads the program in the memory 1802, and performs the following processes based on the program:

obtaining an identifier of a user management function UMF entity to which a UE attaches;

generating a key of the UE and a verification parameter for the UMF entity;

sending, by using the communications interface, configuration information to the UMF entity, where the configuration information is signed by using a private key of the security function entity and encrypted by using a public key of the UMF entity, and the configuration information includes the key, identity information of the UE, and the verification parameter;

receiving, by using the communications interface, verification information returned by the UMF entity, where the verification information is obtained by the UMF entity after the UMF entity encrypts the verification parameter by using the key; and determining, after determining that the verification information is valid, that the key is successfully delivered.

In FIG. 16 to FIG. 18, the processor, the memory, and the communications interface are connected by using a bus architecture. The bus architecture may include any quantity of interconnected buses and bridges. Specifically, various circuits of one or more processors represented by the processor and a memory represented by the memory are linked together. The bus architecture may further link various other circuits, for example, a peripheral device, a voltage regulator, and a power management circuit. All these are well known in the art, and therefore, are not further described in this specification. A bus provides a bus interface. The communications interface may be a plurality of elements, to be specific, including a sending interface and a transceiver interface, and provide a unit for communicating with various other apparatuses on transmission media. The processor is responsible for managing the bus architecture and common processing, and the memory may store data used when the processor performs an operation.

A person skilled in the art should understand that the embodiments of this application may be provided as a method, a system, or a computer program product. Therefore, this application may use a form of hardware only embodiments, software only embodiments, or embodiments with a combination of software and hardware. Moreover, this application may use a form of a computer program product that is implemented on one or more computer-usable storage media (including but not limited to a disk memory, an optical memory, and the like) that include computer-usable program code.

It should be understood based on the flowcharts and/or the block diagrams of the method, the device (e.g., the system), and the computer program product in the embodiments of this application that, computer program instructions may be used to implement each process and/or each block in the flowcharts and/or the block diagrams and a combination of a process and/or a block in the flowcharts and/or the block diagrams. These computer program instructions may be provided for a general-purpose computer, a dedicated computer, an embedded processor, or a processor of any other programmable data processing device to generate a machine, so that the instructions executed by a computer or a processor of any other programmable data processing device generate an apparatus for implementing a specific function in one or more processes in the flowcharts and/or in one or more blocks in the block diagrams.

These computer program instructions may be stored in a computer readable memory that can instruct the computer or any other programmable data processing device to work in a specific manner, so that the instructions stored in the computer readable memory generate an artifact that includes an instruction apparatus. The instruction apparatus implements a specific function in one or more processes in the flowcharts and/or in one or more blocks in the block diagrams.

These computer program instructions may be loaded onto a computer or another programmable data processing device, so that a series of operations and steps are performed on the computer or the another programmable device, thereby generating computer-implemented processing. Therefore, the instructions executed on the computer or the another programmable device provide steps for implementing a specific function in one or more processes in the flowcharts and/or in one or more blocks in the block diagrams.

Obviously, a person skilled in the art can make various modifications and variations to this application without departing from the spirit and scope of this application. This application is intended to cover these modifications and variations of this application provided that they fall within the scope of protection defined by the following claims and their equivalent technologies.

What is claimed is:

1. A method for verifying a key requester, comprising:
receiving, by a security function entity, a request message sent by a first core-network network element, wherein the request message carries an identifier of the first core-network network element, identity information of a user equipment (UE), and a first token; and determining, by the security function entity, to provide a key for the first core-network network element when determining, based on the identifier of the first core-network network element and the identity information of the UE, that the first token is valid, wherein before the receiving, by the security function entity, the request message sent by the first core-network network element, the method further comprises:

generating, by the security function entity, a first fresh parameter; and sending, by the security function entity, the first fresh parameter to a second core-network network element, wherein the second core-network network element generate the first token based on the identifier of the first core-network network element to which the UE attaches, the identity information of the UE, the first fresh parameter, and a shared key.

2. The method according to claim 1, wherein the shared key is generated by the security function entity and sent by the security function entity to the second core-network network element, or the shared key is generated by the security function entity and the second core-network network element individually.

3. The method according to claim 1, wherein the determining, by the security function entity based on the identifier of the first core-network network element and the identity information of the UE, that the first token is valid comprises:

generating, by the security function entity, a second token based on the identifier of the first core-network network element, the identity information of the UE, the first fresh parameter corresponding to the first core-network network element, and the shared key; and determining that the first token is valid when determining that the first token is the same as the second token.

4. The method according to claim 1, wherein the first token is generated by a second core-network network element using a private key of the second core-network network element, the identifier of the first core-network network element to which the UE attaches, the identity information of the UE, and a second fresh parameter.

5. The method according to claim 1, wherein the determining, by the security function entity based on the identifier of the first core-network network element and the identity information of the UE, that the first token is valid comprises:

sending, by the security function entity, the identity information of the UE, the first token, and the identifier of the first core-network network element to the second core-network network element; and receiving, by the security function entity, a response message returned by the second core-network network element, wherein the response message is used to indicate that the first token is valid, and the response message is returned after the second core-network network element generates a second token based on the identity information of the UE, the identifier of the first core-network network element, a second fresh parameter corresponding to the identity information of the UE, and a private key of the second core-network network element that are provided by the security function entity, and determines that the first token is the same as the second token.

6. A device for verifying a key requester, comprising:

a transceiver, configured to receive a request message sent by a first core-network network element, wherein the request message carries an identifier of the first core-network network element, identity information of a user equipment (UE), and a first token; and at least one processor in communication with a memory storing one or more instructions, wherein the processor executes the instructions to:

determine to provide a key for the first core-network network element when determining, based on the identifier of the first core-network network element and the identity information of the UE, that the first token is valid wherein the device further comprises:

the at least one processor configured to: generate a first fresh parameter before receiving the request message sent by the first core-network network element; and the transceiver configured to: send the first fresh parameter to a second core-network network element, wherein the second core-network network element generates the first token based on the identifier of the first core-network network element to which the UE attaches, the identity information of the UE, the first fresh parameter, and a shared key.

7. The device according to claim 6, wherein the shared key is generated by the device and sent by the device to the second core-network network element, or the shared key is generated by the device and the second core-network network element individually.

8. The device according to claim 6, wherein the at least one processor is configured to:

generate a second token based on the identifier of the first core-network network element, the identity information of the UE, the first fresh parameter corresponding to the first core-network network element, and the shared key; and determine that the first token is valid when determining that the first token is the same as the second token.

9. The device according to claim 6, wherein the first token is generated by a second core-network network element using a private key of the second core-network network element, the identifier of the first core-network network element to which the UE attaches, the identity information of the UE, and a second fresh parameter.

10. The device according to claim 6, further comprising the transceiver configured to:

send the identity information of the UE, the first token, and the identifier of the first core-network network element to the second core-network network element; and receive a response message returned by the second core-network network element, wherein the response message is used to indicate that the first token is valid, and the response message is returned after the second core-network network element generates a second token based on the identity information of the UE, the identifier of the first core-network network element, a second fresh parameter corresponding to the identity information of the UE, and a private key of the second core-network network element that are provided by the device, and determines that the first token is the same as the second token.

* * * * *